United States Patent [19]

Blalock

[11] 4,296,855
[45] Oct. 27, 1981

[54] ELECTRICALLY CONDUCTIVE FABRIC

[75] Inventor: Gary L. Blalock, Canal Fulton, Ohio

[73] Assignee: The B. F. Goodrich Company, Akron, Ohio

[21] Appl. No.: 125,291

[22] Filed: Feb. 27, 1980

Related U.S. Application Data

[63] Continuation of Ser. No. 941,871, Sep. 13, 1978, abandoned.

[51] Int. Cl.³ ............................................. B65G 43/00
[52] U.S. Cl. .................................. 198/502; 198/856; 57/250; 428/244; 428/252; 428/255; 428/257; 428/272; 428/367; 428/408; 139/419
[58] Field of Search ............... 428/244, 245, 247, 255, 428/252, 257, 265, 367, 272, 408; 198/502, 856; 57/250

[56] References Cited

U.S. PATENT DOCUMENTS

| | | | |
|---|---|---|---|
| 2,669,646 | 2/1954 | Ford | 174/133 R |
| 3,792,459 | 2/1974 | Snyder | 198/502 |
| 4,061,827 | 12/1977 | Gould | 428/367 |
| 4,208,696 | 6/1980 | Lindsay et al. | 428/244 |

Primary Examiner—James J. Bell
Attorney, Agent, or Firm—Michael J. Colitz, Jr.

[57] ABSTRACT

An electrically conductive fabric particularly adapted for use as a controlling antenna in a conveyor belt. The fabric includes filler and warp yarns of an electrically insulating material suffused with electrically conducting carbon particles, the warp and filler being woven in an open mesh configuration. The open mesh configuration is secured by a leno weave and a vulcanized elastomeric material surrounds the yarns.

5 Claims, 5 Drawing Figures

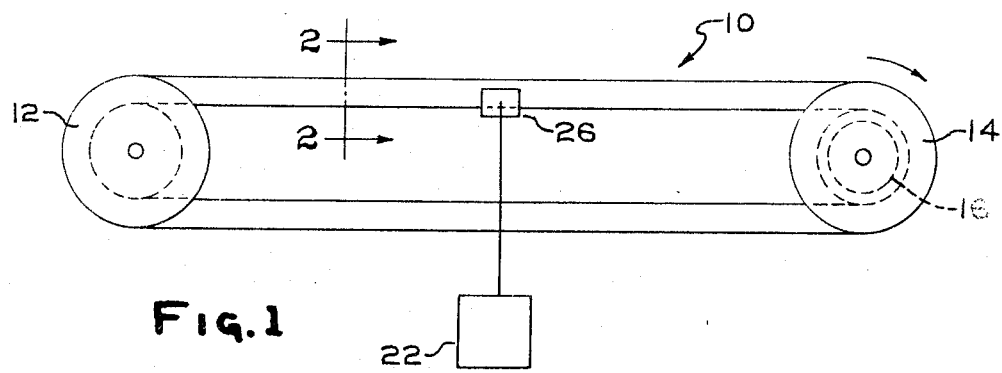
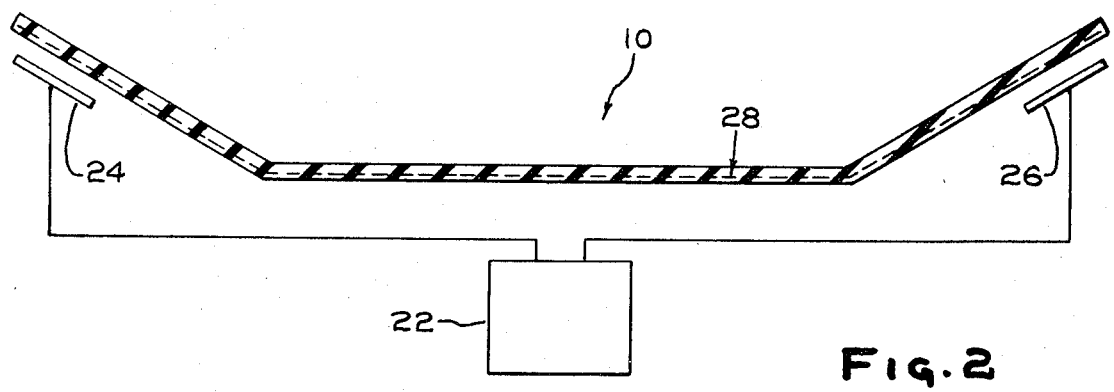
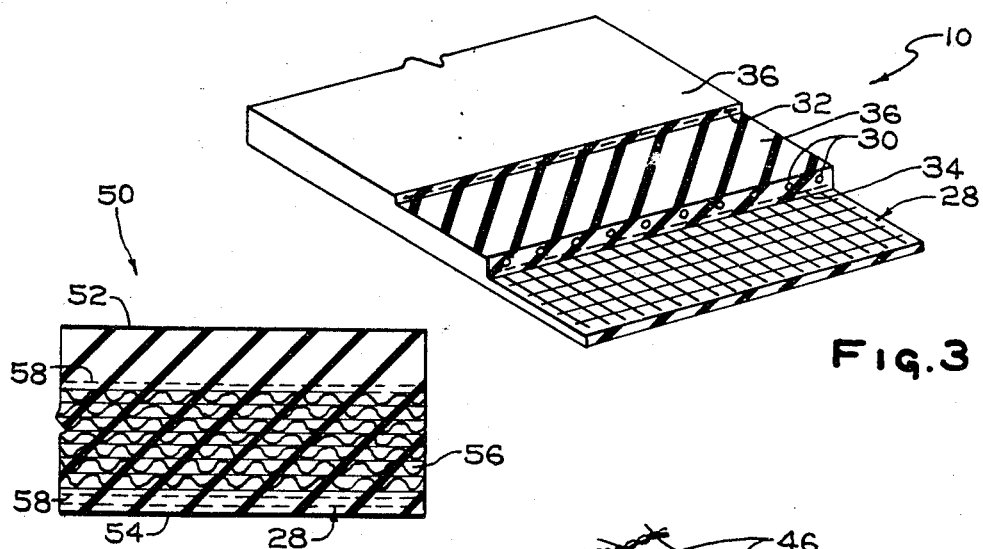
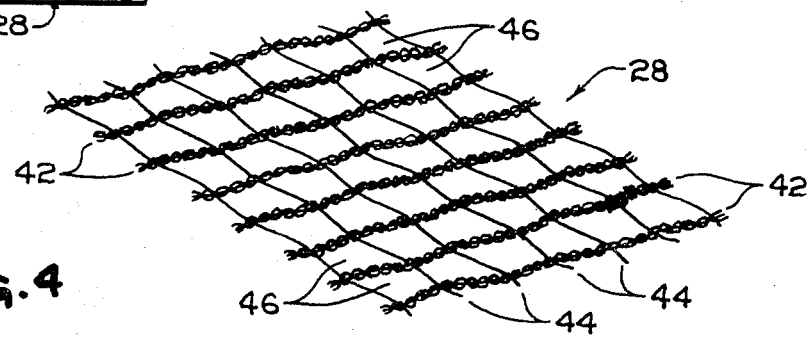

ELECTRICALLY CONDUCTIVE FABRIC

This is a continuation of application Ser. No. 941,871, filed Sept. 13, 1978 now abandoned.

BACKGROUND OF THE INVENTION

In long endless conveyor belts of the type having an electrically insulating body used to convey bulk material, there is a possibility of encountering a rip in the belt. This may occur, for example, by sharp objects being dropped thereon at a loading station. It is desirable to promptly detect such longitudinal rips and, preferably, shut down and repair the conveyor belt upon such detection, thereby minimizing damage to the belt.

In prior art structures as described, for example, in U.S. Pat. No. 3,792,459 issued to Frank D. Snyder, there is disclosed a conveyor belt rip detector system of the type in which the instant invention may be employed. In such a rip detector system, a plurality of equally spaced antenna are imbedded transversely at spaced-apart locations in the belt so as to periodically couple an electrical signal from a transmitter probe to a receiver probe while the belt, with its respective antennae, moves past the electrical sensor probes. The detected electrical signals may thus function to monitor the performance of the belt and shut down the system in response to a break in an antenna which would be indicative of a longitudinal rip in the belt. Detection of the break will permit correction before the break or rip gets too long and seriously destroys the entirety of the belt or before the belt assembly ceases to function properly. A failure, noted timely, can be corrected with minimum cost and inconvenience.

In the prior art devices it has been the general practice to utilize antennae made of metallic screens or wires such as steel extending transversely across the width of the belt, at equally spaced apart distances. Such wires function properly during normal operations for a period of time. Unfortunately, however, due to movement of the belt and wires around the conveyor rollers of the system, continued flexing stresses upon the antenna wires may cause premature breakage of the wires, thus causing a malfunction in the system. Metallic wires are also susceptible of breakage caused by ore dropped on the belt at a loading station. A broken antenna, caused by failure of any nature, will undesirably give the appearance to the control system that there is a rip in the belt. The system could then improperly shut down the conveying system when in fact there is no such rip in the belt. Alternate programming of the control system may also be employed.

SUMMARY OF THE INVENTION

The present invention relates to a fabric for use as the antennae for replacement of the prior art devices. In accordance with the preferred embodiment of instant invention, the fabric is constructed of warp yarns of nylon strands, suffused with electrically conductive carbon particles. The strands are then twisted to constitute electrically conductive yarns adapted to be imbedded in a conveyor belt and to extend across the width of the belt. Nylon strands, also suffused with carbon particles, are also twisted to constitute the filler yarns. The warp and filler yarns are woven into a leno weave with sufficient spacing between yarn segments to constitute a path for rubber to flow therethrough during vulcanization of rubber layers on opposite sides of the fabric. The rubber extending through the yarn interstices helps keep the yarns properly spaced so that the fabric is well suited to carry out functioning as antennae for the control system of a conveyor. Such a system does not suffer from premature breakage of the antennae which would cause the loss of electrical conductivity between the probes of the control system.

In order to gain a better understanding of the invention as well as other advantages and further features thereof, reference is made to the following detailed description of the invention to be read in conjunction with the accompanying drawings forming part of this application.

BRIEF DESCRIPTION OF THE DRAWINGS

FIG. 1 is a schematic side elevational view of a conveyor assembly and control system adapted to utilize antennae constructed of the fabric of the instant invention;

FIG. 2 is a schematic sectional view of the assembly of FIG. 1 taken through the belt, fabric antenna, sensor probes, and control circuitry;

FIG. 3 is a perspective view of the belt of FIGS. 1 and 2 with layers removed to show internal constructions, including a fabric antenna;

FIG. 4 is an enlarged view of a fabric antenna of FIGS. 2 and 3;

FIG. 5 is a sectional view of an alternate belt assembly employing the fabric antennae of the instant invention.

DESCRIPTION OF THE PREFERRED EMBODIMENT

As shown in the figures, with particular reference to FIG. 1, there is shown a conveyor belt assembly constructed to utilize the antennae made of the fabric of the instant invention. The conveyor belt, generally designated as 10, is trained around a plurality of rollers 12 and 14 powered by a drive source, or motor 16, to move the belt in a continuous cycle of operation. The belt has an upper surface for conveying ore or other material between a loading station and a discharge station. Opposite the upper surface is a return surface. The edges of the belt are preferably turned up slightly at their edges at least along the upper surface to minimize slippage of conveyed ore therefrom. The belt is schematically shown as travelling over a short distance between two rollers. It should be understood that belts of this type are readily adapted for conveying ore over great distances including many hundreds or thousands of yards. Further, only two rollers, 12 and 14, are shown for illustrative purposes. Many rollers could be suitably utilized to permit conveying of materials great distances, up extended heights and even around corners.

Utilized in conjunction with the conveyor belt 10 and drive source 16 is a control mechanism or assembly 22 including electrical sensors or probes 24 and 26 fixedly positioned adjacent and upper surface of the belt. The probes are located adjacent opposite edges of the belt and are adapted to monitor its movement and feed intelligence to the control mechanism 22. This in turn is adapted to act in a servo-loop configuration, through appropriate circuitry, back to motor 16. In this manner, the motive force to the belt may be terminated in response to a rip in any antenna 28 which is fixedly mounted within the belt for movement therewith.

In the preferred mode, a plurality of antennae are adapted to be located at fixed, evenly spaced intervals within the belt. These antennae could be spaced at ten, twenty, or fifty feet or more or less but generally as a function of the belt size and speed and the control program utilized. They may thus be utilized to detect the presence and movement of unbroken antennae within the belt as they move past sensors 24 and 26. A more complete understanding of the belt assembly and control system can be had by reference to the aforementioned patent to Snyder.

Shown in FIGS. 3 and 4 is the preferred fabric for use as an antenna constructed in accordance with the instant invention. The preferred antenna is shown in a conveyor belt wherein it may be beneficially utilized. The belt 10 as shown particularly in FIG. 3 includes steel cables 30 which prevent the belt from stretching in the direction of belt movement and which provide great strength to the belt. The cables also prevent the belt from tearing across its width. Reinforcement in both the length and width of the belt is provided by fabric sheets or breakers 32 and 34 on opposite sides of the centrally located cables 30. Various layers of vulcanized elastomeric material such as rubber 36, natural or synthetic combinations thereof blended for belting purposes, are located on opposite sides of the cables 30 and sheets 32 and 34. The cables, sheets and rubber all run in the continuous loop configuration for carrying out the conveying function.

While the belt in FIG. 3 has breakers top and bottom, the invention will function equally as well without such sheets or breakers 32 and 34.

An alternate belt construction employing the antennae of the instant invention is shown in FIG. 5. The belt 50 has rubber upper and lower cover layers 52 and 54 on opposite faces. Rubberized fabric layers 56 are located between the cover layers with fabric sheets or breakers 58 located at the interfaces between the rubberized fabric layers and cover layers. The breakers are constructed of a fabric material and aid in bonding the carcass layers to the cover layers. They also add impact resistance to the belt. The fabric antennae 28 are located within the lower cover layer 54. The breakers, covers, and fabric carcass extend continuously along the length of the endless belt. The antennae are evenly spaced along the length of the belt and function in the manner of the aforementioned belt.

It should be understood, however, that the antennae of the instant invention can function equally well in any belt assembly with or without cables or with or without breakers or with or without fabric carcass plies.

Located between layers of the rubber are segments of the fabric 28 which function as the rip detecting antennae. The rubber is a vulcanizable elastomeric material so that during the vulcanizing of the belt, the rubber will flow through interstices of the fabric, surrounding each of the yarns and become part of the fabric holding the individual yarns in their proper, spaced orientations.

Extending transverse to the direction of belt motion are the warp yarns 42, constructed of an electrically insulating material, preferably monofilament polymer strands such as polyamide known as nylon. The strands are first suffused or otherwise coated or impregnated with electrically conductive parts or particles such as carbon.

In fabricating the electrically conductive monofilament strands for a preferable construction to carry out the instant invention, polymer monofilament strands at about 20 denier per filament are first treated. This is done by first moving them through an acid bath which will dissolve the surface area somewhat. While the surface is still in a tacky state, the monofilament strands are then moved through a second bath containing a mixture of carbon and polymer, preferably the same polymer as the original monofilament strands. The speed of motion through this second bath should be sufficient to permit the tacky surface to pick up an added 5% by weight of the contents of the bath. This will raise the monofilament strands from an initial 20 denier per filament to about 21. This second bath contains a slurry of electrically conductive material such as carbon intermixed with the polymer in a liquid state to effect the desired coatings. After movement through the second bath, the monofilament strands will then be dried to create new, completely fused monofilament strands having an electrically conductive surface due to the presence of the carbon particles. These new monofilament strands will preclude removal of the conductive segments during normal flexing, handling, or other manipulation. While many polymers may be utilized, polyamide, known as nylon, is preferred.

A plurality of these strands are preferably twisted along their lengths for added strength to constitute the warp yarns which are then woven with the weft or filler yarns 44. The weft or filler yarns are likewise made up of nylon strands suffused with carbon, a group of which strands are twisted to constitute the weft or filler yarns. The warp and filler yarns are then woven in an open mesh configuration as through a leno weave. By a leno weave it is meant a weave in which the warp lines are arranged in pairs with one twisted around the other between picks of filler or weft yarn as in a marquisette. This type of weave gives firmness and strength to an open weave fabric and prevents slippage and displacement of the warp and filler yarns with respect to each other. In this manner large interstices 46 can be created in the fabric and held there until utilization of the fabric as between the elastomeric layers of the belt during the vulcanization process.

A material for use as the strands to be twisted to constitute the individual yarns of the fabric of the instant invention is commercially available. Known applications, however, generally employ such strands in combination with conventional nonconductive strands for the elimination or dissipation of static electricity. The electrical nature of such known fabrics are thus insufficiently conductive for the preferred embodiment of the present inventive purposes of functioning as an active electrical element in a circuit electrically coupling spaced probes.

The warp yarns extending in one dimension, across the width of the conveyor belt, must be electrically conductive for proper functioning as a controlling antenna in the circuitry. The filler yarns need not necessarily be electrically conductive but such is preferred since they may assist in generating an electrical grid in both directions of the fabric to extend the conductivity of each antenna.

During the vulcanization process of the belt laminate, the elastomeric rubber on opposite sides of the fabric flow through the interstices to hold the warp and filler yarns at the proper equal spacings. The rubber also creates an excellent bond to prevent slippage of the antennae in the belt and minimize belt breakage, as during operation. This non-slipping condition is desired since antennae slippage either sideways or along the linear path during operation could cause a malfunction of the detection function.

Each antenna is preferably about 20 centimeters in length and extends substantially full width across the belt or at least a distance extending from probe to probe and sufficient to cover all lengths between cables where ripping is likely to occur. The probes are generally 15 centimeters in length to accommodate the preferred probes for installations in commercial use. Variations in these dimensions and ratios are acceptable as a function of the controlling programming involved.

While the instant invention is described above with regard to a preferred embodiment, it is intended to be covered broadly within the spirit and scope of the appended claims.

I claim:

1. A fabric including filler yarns and warp yarns, the filler yarns comprising thin strands of carbon suffused nylon twisted along their lengths and the warp yarn comprising thin strands of carbon suffused nylon twisted along their lengths, said filler yarns and said warp yarns being woven in a leno weave to form interstices of such extent whereby an elastomeric material on opposite sides thereof may flow therethrough during vulcanization.

2. The fabric as set forth in claim 1 and further including a vulcanized elastomeric material surrounding all of said yarns to support said yarns in their woven configuration.

3. For use as a controlling antenna to detect rips in a flexible conveyor belt in which it is located, a flexible fabric constructed of first yarns extending in a first direction and second yarns extending in a second direction transverse to said first direction, the yarns in at least one of said directions extending from end to end of the fabric and being formed of a plurality of strands previously and continuously provided along their entire lengths with electrically conductive particles to form a continuous electrically conductive path across the fabric and substantially from edge to edge of the conveyor belt in which it is located, said first and second yarns being joined together in an open mesh configuration with interstices therebetween, and elastomeric material of the conveyor belt in which the fabric is located being on both sides of said yarns and in contact therewith and extending through the interstices of said fabric to hold said fabric in its open mesh configuration and fixedly positioned within the conveyor belt in which it is located.

4. A flexible conveyor belt formed of an elastomeric material, said belt having positioned therein rip detecting antennae in the form of flexible electrically conductive fabric constructed of yarns, said yarns being made up of strands, said strands being formed of an electrically non-conductive material continuously pre-coated with electrically conductive carbon particles sufficient to form an electrically conductive path throughout the fabric, said yarns being coupled together in an open mesh configuration to form interstices therebetween, whereby the elastomeric material of said belt on both sides of said yarns extends through the interstices of the fabric to hold the fabric in its open mesh configuration.

5. In a flexible conveyor belt formed of an elastomeric material, a plurality of rip detecting antennae spaced along the length of the belt, each of said antenna being constructed of yarns formed of electrically non-conductive synthetic strands continuously carrying along their entire lengths electrically conductive particles to thereby form a continuous electrically conductive path substantially across the width of the belt, said yarns of each antenna being positioned with interstices between said yarns and with the elastomeric material of the conveyor belt surrounding said yarns on both sides of said yarns and through the interstices therebetween.

* * * * *